(12) United States Patent
Tomaru et al.

(10) Patent No.: US 7,886,630 B2
(45) Date of Patent: Feb. 15, 2011

(54) ELECTRIC STEERING DEVICE

(75) Inventors: Masaki Tomaru, Gunma (JP); Yuuichi Tomaru, Gunma (JP); Kouhei Yonezawa, Gunma (JP); Naoki Sawada, Gunma (JP)

(73) Assignee: NSK Ltd., Tokyo (JP)

( * ) Notice: Subject to any disclaimer, the term of this patent is extended or adjusted under 35 U.S.C. 154(b) by 930 days.

(21) Appl. No.: 11/703,654

(22) Filed: Feb. 8, 2007

(65) Prior Publication Data

US 2007/0180945 A1 Aug. 9, 2007

(30) Foreign Application Priority Data

Feb. 9, 2006 (JP) ............................. 2006-032580
Dec. 25, 2006 (JP) ............................. 2006-347157

(51) Int. Cl.
*B62D 1/18* (2006.01)
(52) U.S. Cl. ........................................ 74/493; 74/89.37
(58) Field of Classification Search .................. 74/492, 74/493, 89.37
See application file for complete search history.

(56) References Cited

U.S. PATENT DOCUMENTS

| | | | | |
|---|---|---|---|---|
| 4,669,325 A | * | 6/1987 | Nishikawa et al. | ......... 74/89.23 |
| 4,739,673 A | * | 4/1988 | Ishikawa et al. | ............... 74/493 |
| 6,711,965 B2 | | 3/2004 | Tomaru et al. | |
| 7,025,380 B2 | | 4/2006 | Arihara | |
| 2004/0023746 A1 | | 2/2004 | Arihara | |
| 2004/0144192 A1 | | 7/2004 | Tomaru et al. | |
| 2004/0194570 A1 | * | 10/2004 | Tomaru et al. | ................ 74/495 |
| 2005/0284251 A1 | | 12/2005 | Inayoshi et al. | |

FOREIGN PATENT DOCUMENTS

| | | |
|---|---|---|
| JP | 2000-085592 A | 3/2000 |
| JP | 2000-280916 A | 10/2000 |
| JP | 2004-291791 A | 10/2004 |
| WO | WO 03/078234 A1 | 9/2003 |

* cited by examiner

*Primary Examiner*—Richard W Ridley
*Assistant Examiner*—Terence Boes
(74) *Attorney, Agent, or Firm*—Sughrue Mion, PLLC

(57) ABSTRACT

When a column 4 reaches a tilting ascent end, the lower end 732 of a nut 73 abuts on the buffering segment 83 of a buffer 82. Thus, while the buffering segment 83 of the buffer 82 is elastically deformed, the nut 73 stops with no impact. Accordingly, the inertia when the nut 73 stops is restrained and the tightening torque of the nut 73 when the nut 73 stops is also restrained. For this reason, when an electric motor 61 is rotationally driven in a reverse direction, a feeding screw shaft 71 rotates in the reverse direction with the normal rotation torque of the electric motor 61. Thus, the nut 73 is caused to ascend in the axial direction along the screw segment of the feeding screw shaft 71 so that the column 4 can be tiltingly moved downward.

12 Claims, 11 Drawing Sheets

ELECTRIC STEERING DEVICE

This application claims priority from Japanese Patent Application Nos. JP-2006-032580 and JP-2006-347157, filed on Feb. 9, 2006 and Dec. 25, 2006 in the Japanese Patent Office, the entire disclosure of which is incorporated herein by reference.

BACKGROUND OF THE INVENTION

1. Field of the Invention

The present invention relates to an electric steering device, and more particularly to an electric steering device capable of adjusting a tilting position or a telescopic position of a steering wheel by an electric motor.

2. Description of Related Art

Recently, it has been required to adjust the tilting position and telescopic position of a steering wheel according to the physique and driving posture of a driver. For the purpose of facilitating the adjustment of the tilting position or telescopic position using an electric motor, mostly, an electric steering device has been adopted. Such an electric steering device is disclosed in for example PCT Publication WO03/078234.

The electric steering device disclosed in WO03/078234 uses a nut serving as a feeding mechanism which transmits the rotation of an electric motor as the tilting motion or telescopic motion of a column; the nut makes a linear motion by the rotation of a feeding screw shaft.

In order to make compact and improve rigidity of such an electric steering device, it is necessary to make identical the mechanically movable range and the controllably movable range of the tilting motion or telescopic motion wherever possible.

However, where the mechanically movable range and the controllably movable range are made identical wherever possible, if the rotation of the electric motor is not quickly stopped at the moving end of the nut, the nut will strike with a securing portion of the moving end and so tightened by a screw segment of the feeding screw shaft.

When the nut is tightened at the moving end thereof by the screw segment of the feeding screw shaft, since the friction acting on between the nut and the screw segment of the feeding screw shaft is dynamic friction, the friction coefficient is relatively small. When the nut thus tightened is loosened, however, the friction coefficient becomes relatively large because the friction at this time is static friction. Therefore, large torque is required to loosen the nut which has struck with the securing portion and so has been tightened.

SUMMARY OF THE INVENTION

An object of the present invention is to provide an electric steering device capable of surely loosening a nut without being tightened with large torque on the screw segment of a feeding screw shaft even when the nut or the column strikes with the securing portion of a moving end at the moving end of a tilting motion or telescopic motion.

In order to achieve the above-mentioned object, according to a first aspect of the invention, there is provided an electric steering device comprising:

a steering shaft of which vehicular-rear side is capable of mounting a steering wheel;

a column that pivotably supports the steering shaft, the column allowing adjustment of a tilting position on a fulcrum of a tilting center axis or of a telescopic position along a center axial line of the steering shaft;

an electric actuator attached to the column;

a feeding screw shaft that is pivotably supported on the column so as to be rotated by the electric actuator and has a screw segment on an outer circumferential surface thereof;

a nut that is screwed on the screw segment of the feeding screw shaft, and converts a rotation of the feeding screw shaft into a linear motion to transmit the linear motion as a tilting motion or telescopic motion of the column; and buffers each of which abuts on the nut at moving ends of the linear motion of the nut thereby to buffer an impact force when the nut stops at the moving end.

According to a second invention, as set forth in the first aspect of the invention, it is preferable that the buffers abut on the column at a tilting ascent end or a tilting descent end of the column thereby to buffer an impact force when the column stops at the moving end of the column.

According to a third aspect of the invention, as set forth in the first aspect of the invention, it is preferable that the buffers abuts on the column at a telescopic advanced end and a telescopic retracted end of the column thereby to buffer an impact force when the column stops at the moving end of the column.

According to a fourth aspect of the invention, as set forth in the first aspect of the invention, it is preferable that the column comprises:

an outer column; and an inner column supported on the outer column so as to allow adjustment of a telescopic position;

wherein the electric steering device further comprises:

a spherical protrusion on the nut;

an opening on the outer column; and a cylindrical sleeve that is projecting from the inner column toward the outer column through the opening, and fits on the spherical protrusion thereby to transmit the linear motion of the nut to the inner column, wherein the buffers are formed at each of a front end and a rear end of the opening, each of the buffers abuts on the sleeve at each of a telescopic advanced end or a telescopic retracted end of the inner column thereby to buffer an impact force when the sleeve stops at a moving end of the inner column.

According to fifth to eighth aspects of the invention, as set forth in the first through fourth aspects of the invention, it is preferable that the buffer is formed in a hollow disk shape, and an inner hole of the buffer is fit on the outer circumferential surface of the feeding screw shaft.

According to ninth to twelfth aspects of the invention, as set forth in the first to fourth aspects of the invention, it is preferable that the buffer comprises:

a buffering segment made of an elastic material; and a reinforcing segment made of a metallic material, wherein the buffering segment and the reinforcing segment are joined to each other.

According to thirteenth to sixteenth aspects of the invention, as set forth in the first through fourth aspects of the invention, it is preferable that the electric actuator is controlled to be stop within an elastic limit of the buffer.

According to the invention, the buffer is provided which abuts on the nut or the column at the moving end of the tilting motion or telescopic motion of the column to buffer the impact force when the nut stops at the moving end. Therefore, even when the nut or the column strikes with the securing portion of each moving end, the nut will not be tightened with large torque on the screw segment of the feeding screw shaft and so will be surely loosened.

Further, in the electric steering device according to the present invention, because of the presence of the buffer, a long permissible time can be taken until the nut or the column stops
} at the moving end. Therefore, also in the fail-safe function such as protective control of an excessive current, control is made so that the electric actuator stops within an elastic limit of the buffer. Thus, the impact at the time of stop can be alleviated. In addition, as regards the inconvenience of position control due to voltage shortage or pulse drift of a control signal, the operation of the electric actuator can be stopped while the impact is alleviated.

DETAILED DESCRIPTION OF EXEMPLARY EMBODIMENTS OF THE INVENTION EMBODIMENTS

Figure 1:
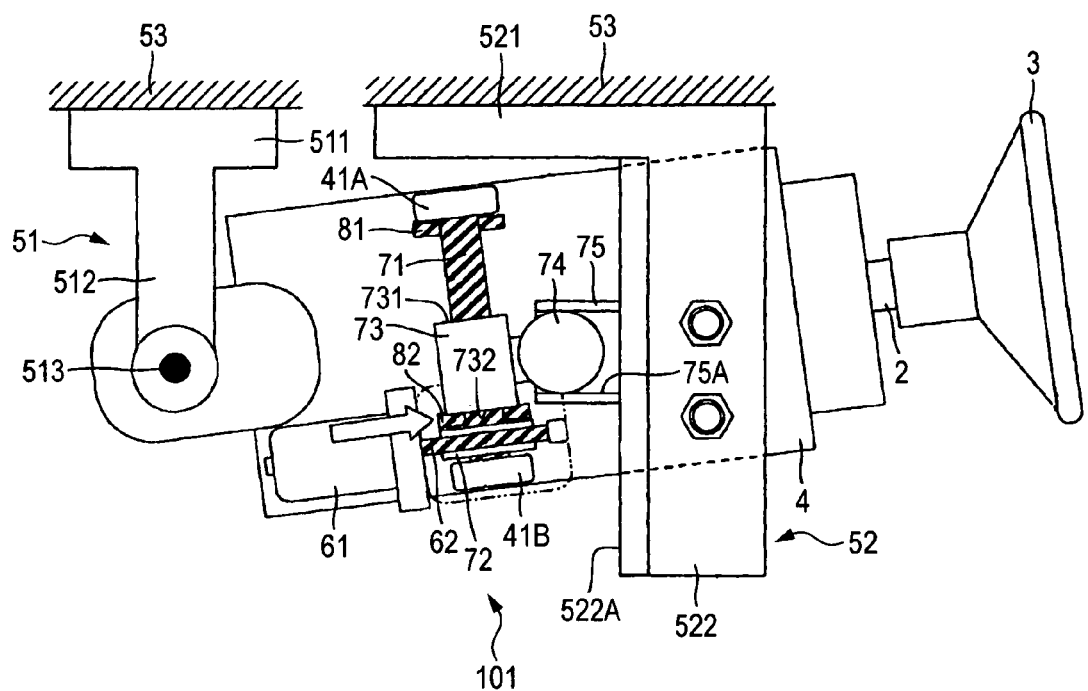
FIG. 1 is a schematic view of the main part including a partial section of an electric tilting steering device according to the first embodiment of the present invention, which illustrates the state stopped at a tilting ascent end.

Now referring to the drawings, an explanation will be given the first to fourth embodiments of the present invention.

Embodiment 1

Figure 2:
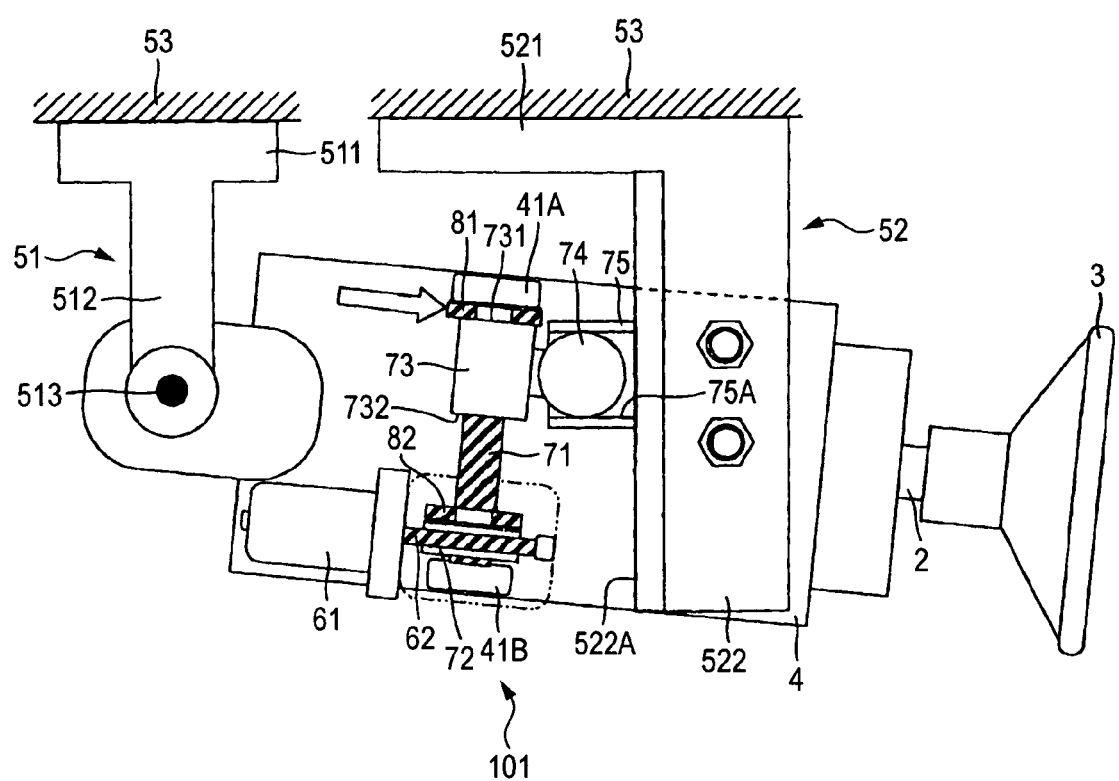
FIG. 2 is a schematic view of the main part including a partial section of the electric tilting steering device shown in FIG. 1, which shows the state stopped at a tilting descent end.
Figure 3A:
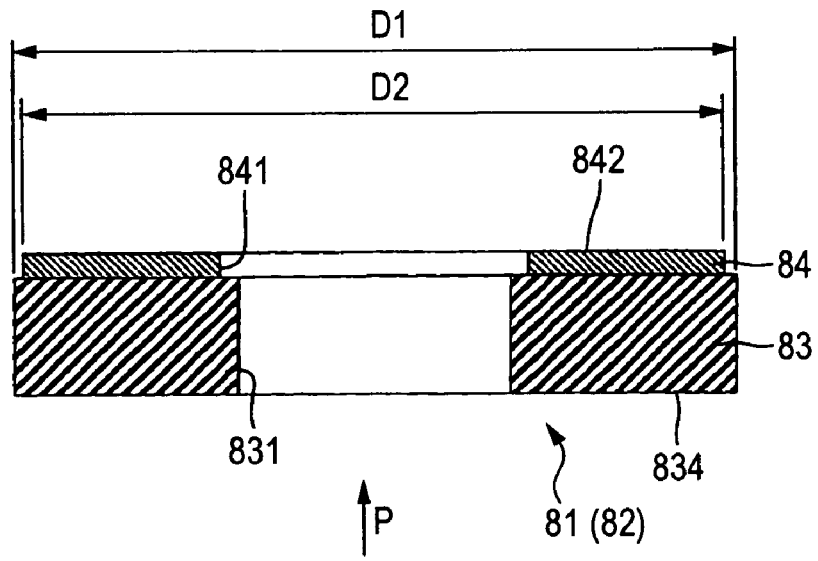
FIG. 3A is longitudinal sectional view of a buffer unit.
Figure 3B:
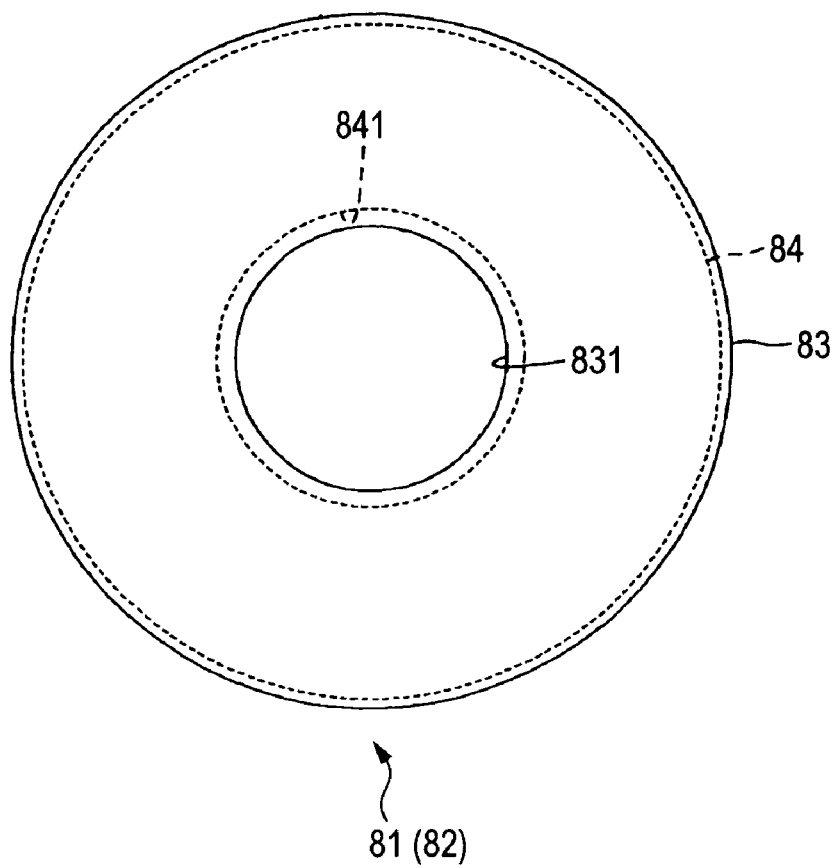
FIG. 3B is a view seen along arrow P in FIG. 3A.
Figure 4A:
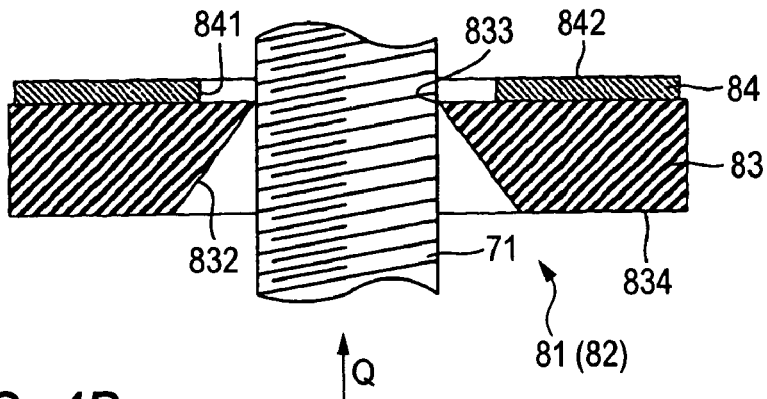
FIG. 4A is a longitudinal sectional view of a modification of the buffer unit.
Figure 4B:
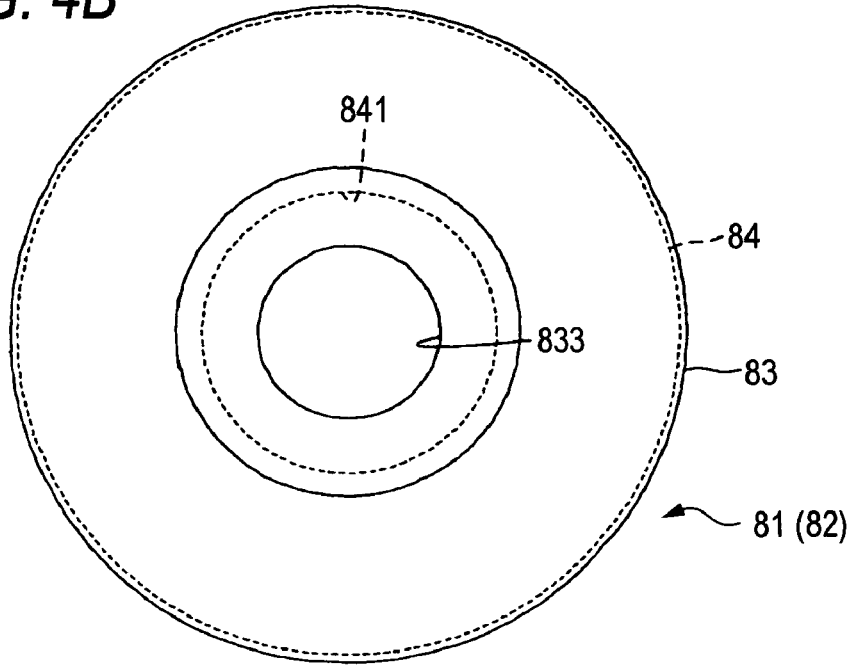
FIG. 4B is a view seen along arrow Q in FIG. 4A.
Figure 4C:
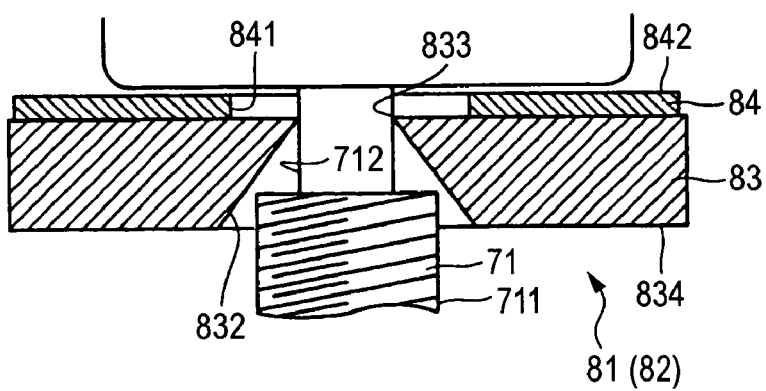
FIG. 4C is a longitudinal sectional view of a further modification of FIG. 4A.

FIG. 1 is a schematic view of the main part including a partial section of an electric tilting steering device 101 according to the first embodiment of the present invention, which illustrates the state stopped at a tilting ascent end. FIG. 2 is a schematic view of the main part including a partial section of the electric tilting steering device 101 shown in FIG. 1, which shows the state stopped at a tilting descent end. FIG. 3 is a view of a buffer unit as a component; FIG. 3A is its longitudinal sectional view and FIG. 3B is a view seen along arrow P in FIG. 3A. FIG. 4 is a view of a modification of the buffer unit as a component; FIG. 4A is a longitudinal sectional view, FIG. 4B is a view seen along arrow Q in FIG. 4A and FIG. 4C is a longitudinal sectional view of a further modification of FIG. 4A.

On the left side of FIG. 1 (the forward side of a vehicle body), an attachment 511 formed at a top of a lower vehicle-body attaching bracket 51 which has a T-shape when seen from above of FIG. 1 is secured to a vehicle body 53. A pivot 512 extends downward from the attachment 511. The left end of a column 4 is supported by the lower vehicle-body attaching bracket 51 swingably on the fulcrum of a pivot pin 513 pivotably supported on the pivot 512.

On the right side of FIG. 1 (the backward side of the vehicle body), another attachment 521 formed at the top of an upper vehicle-body attaching bracket 52 which has an L-shape when seen from above of FIG. 1 is secured to the vehicle body 53. A column support 522 extends downward from the attachment 521. The column support 522 has a pair of walls not shown which sandwiches the column 4 from right and left sides. During the adjustment of the tilting position, the column 4 slides while being sandwiched by the pair of walls and is vertically freely movable.

A steering shaft 2 is pivotably supported on the column 4. A steering wheel 3 is mounted at the right end (backward side of the vehicle body) of the steering shaft 2. When a driver rotates the steering wheel 3, its rotation force is transmitted via the steering shaft 2 to a steering gear not shown. Then, the steering angle of a wheel can be changed through a rack-and-pinion mechanism.

An electric motor (electric actuator) 61 is secured to the left side (when viewed from the driver) of the column 4. Both upper and lower ends of a feeding screw shaft 71 are pivotably supported, respectively, on an upper journal 41A and lower journal 41B which are secured on the left side of the column 4 through a rolling bearing (not shown).

A worm gear 62 is formed integrally to the output shaft of the electric motor 61. A worm wheel 72 secured to the feeding screw shaft 71 meshes with the worm gear 62. The worm wheel 72 and the worm gear 62 constitute a reduction mechanism so that the reduced rotation of the electric motor 61 is transmitted to the feeding screw shaft 71. A nut 73, which converts the rotation motion of the feeding screw shaft 71 into a linear motion, is screwed on the screw segment of the feeding screw shaft 71.

On the left side of FIG. 1, a ball 74 having a spherical protrusion is formed integrally to the nut 73. A cylindrical sleeve 75 is formed integrally to the left end face 522A (in FIG. 1) of the column support 522 and the outer circumferential surface of the ball 74 is slidably fit in the inner circumferential surface 75A of the sleeve 75 so that a spherical joint is constituted.

Between the upper journal 41A and the upper end 731 of the nut 73, a buffer 81 is fit on the outer circumferential surface of the feeding screw shaft 71. Between the worm wheel 72 and the lower end 732 of the nut 73, another buffer 82 is fit on the outer circumferential surface of the feeding screw shaft 71.

The buffers 81 and 82 have the same shape, each of which includes a thick hollow-disk-shaped buffering segment 83 made of an elastic material such as rubber, urethane and synthetic resin, and a thin hollow-disk-shaped reinforcing segment (washer) 84 made of a metallic material such as iron (e.g. soft iron), steel (e.g. SK steel, high carbon steel) as shown in FIG. 3. The buffering segment 83 and the reinforcing segment 84 are integrally joined to each other to constitute a laminated structure with improved endurance. The buffers 81 and 82 are fit on the feeding screw shaft 71 in such a way that the inner hole 831 of the buffering segment 83 and the inner hole 841 of the reinforcing segment 84 are fit on the outer circumferential surface of the feeding screw shaft 71.

The buffer 81, 82 is mounted on the outer circumferential surface of the feeding screw shaft 71 with an orientation permitting the upper end face 842 of the reinforcing segment 84 to abut on the upper journal 41A or the worm wheel 72 and permitting the lower end face 834 of the buffering segment 83 to abut on the upper end 731 or lower end 732 of the nut 73. The outer diameter D1 of the buffering segment 83 is made larger than the outer diameter D2 of the reinforcing segment 84. For this reason, when the nut 73 abuts on the buffering segment 83 side so that the buffering segment 83 is elastically deformed, the elastically deformed portion of the buffering segment 83 smoothly expands to the outer circumferential surface of the reinforcing segment 84. This allows the impact at the time of striking to be smoothly absorbed. Further, this prevents metallic sound from being generated due to contact of the outer circumferential surface of the reinforcing segment 84 with peripheral members. Moreover, this is also advantageous to mold the reinforcing segment 84 and buffering segment 83.

FIG. 4 is a view showing a modification of the buffer 81, 82. As seen from FIGS. 4A and 4B, in this modification, with the inner hole 832 of the buffering segment 83 being formed as an inclined hole, an edge 833 thereof with an acute angle is kept in contact with the outer circumferential surface of the feeding screw shaft 71 so that the buffer 81, 82 is held on the outer circumferential surface of the feeding screw shaft 71. Otherwise, with the outer circumferential surface of the feeding screw shaft 71 being cut off at its area in contact with the edge 833, the buffer 81, 82 may be held on the outer circumferential surface of the feeding screw shaft 71 using this cut-off area.

FIG. 4C is a view showing a further modification of the buffer 81, 82 explained in FIGS. 4A and 4B. As seen from FIG. 4C, in this further modification, a small-diameter shaft segment 712 having a smaller diameter than that of the screw segment 711 is formed at the shaft end of the feeding screw shaft 71. Further, with the inner hole 832 of the buffering segment 83 being formed as an inclined hole, an edge 833 thereof with an acute angle is kept in contact with the outer circumferential surface of the small-diameter shaft segment 712 so that the buffer 81, 82 is held on the outer circumferential surface of the small-diameter shaft segment 712. If such a way is adopted, the buffer 81, 82 will never run onto the screw segment 711 of the feeding screw shaft 71.

When necessity of adjusting the tilting position of the steering wheel 3 occurs, operating the switch (not shown), the electric motor 61 is rotationally driven. Then, the reduced rotation of the electric motor 61 is transmitted from the worm gear 62 to the worm wheel 72. Since the feeding screw shaft 71 integrated to the worm wheel 72 rotates, the nut 73 descends in an axial direction along the screw segment of the feeding screw shaft 71.

Then, the ball 74 integrated to the nut 73 also descends with respect to the column 4. In this case, as seen from FIG. 1, because the ball 74 is fit in the sleeve 75, the column 4 tiltingly moves upward. When the column 4 reaches a tilting ascent end, the lower end 732 of the nut 73 abuts on the buffering segment 83 side of the buffer 82. Thus, while the buffering segment 83 of the buffer 82 is elastically deformed, the nut 73 stops with no impact.

Accordingly, the inertia occurred when the nut 73 stops is restrained and the tightening torque of the nut 73 when the nut 73 stops is also restrained. For this reason, when the electric motor 61 is rotationally driven in a reverse direction, the feeding screw shaft 71 rotates in the reverse direction with the normal rotation torque of the electric motor 61. Thus, the nut 73 is caused to ascend in the axial direction along the screw segment of the feeding screw shaft 71 so that the column 4 can be tiltingly moved downward.

As seen from FIG. 2, also when the column 4 reaches a tilting descent end, the upper end 731 of the nut 73 abuts on the buffering segment 83 side of the buffer 81. Thus, while the buffering segment 83 of the buffer 81 is elastically deformed, the nut 73 stops with no impact. Accordingly, the inertia when the nut 73 stops is restrained and the tightening torque of the nut 73 when the nut 73 stops is also restrained.

Embodiment 2

Figure 5:
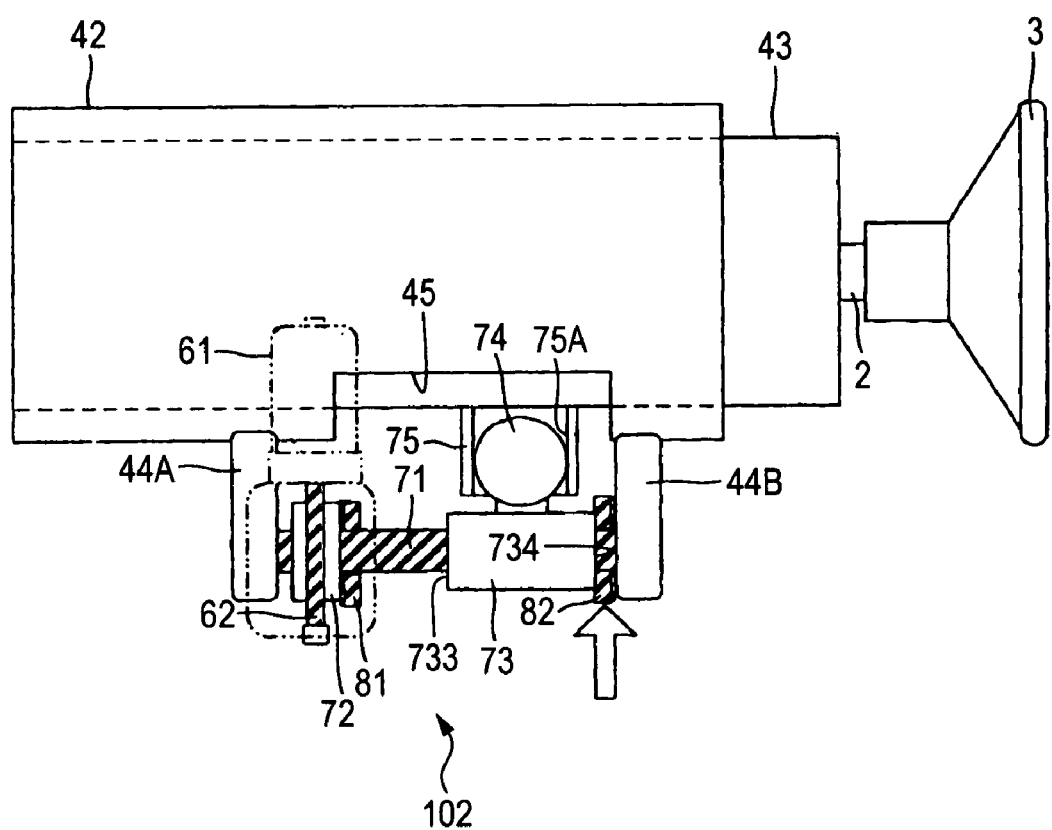
FIG. 5 is a schematic view of the main part including a partial section of an electric telescopic steering device according to the second embodiment of the present invention, which illustrates the state stopped at a telescopic retracted end.
Figure 6:
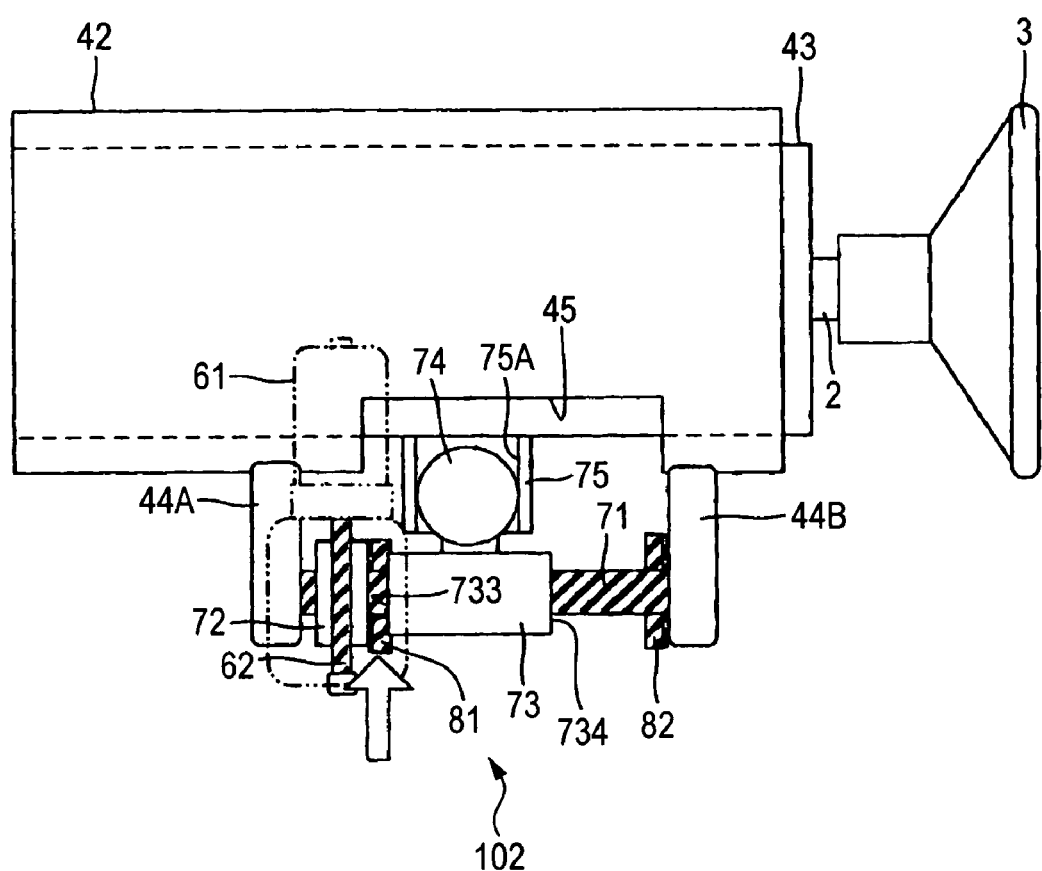
FIG. 6 is a schematic view of the main part including a partial section of the electric telescopic steering device shown in FIG. 5, which shows the state stopped at a telescopic advanced end.

Next, an explanation will be given of the second embodiment of the present invention. FIG. 5 is a schematic view of the main part including a partial section of an electric telescopic steering device 102 according to the second embodiment of the present invention, which illustrates the state stopped at a telescopic retracted end. FIG. 6 is a schematic view of the main part including a partial section of the electric telescopic steering device 102 shown in FIG. 5, which shows the state stopped at a telescopic advanced end. In the following explanation, only the structural portion different from the first embodiment will be explained and overlapping of the explanation will be avoided. Further, in this embodiment, like reference numerals refer to like elements in the first embodiment.

An inner column 43 is fit telescopic-slidably in an axial direction (horizontal direction in FIG. 5) in a hollow cylindrical outer column 42. On the bottom of the outer column 42, an opening 45 is formed. A sleeve 75, which is secured to the inner column 43, protrudes downwardly and outwardly through the opening 45. The opening 45 serves as a detent for stopping the rotation of the inner column 43.

A steering shaft 2 is pivotably supported on the inner column 43. A steering wheel 3 is mounted at the right end (backward side of the vehicle body) of the steering shaft 2. On the lower surface of the outer column 42, a front journal 44A and a rear journal 44B which protrude downward are formed integrally at the front and rear position with respect to the opening 45. Both front and rear ends of a feeding screw shaft 71 are thereby pivotably supported, respectively, through a rolling bearing not shown. Further, an electric motor 61 is secured to the side of the outer column 42.

A worm gear 62 is formed integrally to the output shaft of the electric motor 61. A worm wheel 72 secured to the feeding screw shaft 71 meshes with the worm gear 62. The worm wheel 72 and the worm gear 62 constitute a reduction mechanism so that the reduced rotation of the electric motor 61 is transmitted to the feeding screw shaft 71.

A nut 73 which converts the rotation of the feeding screw shaft 71 into a linear motion is screwed on the screw segment of the feeding screw shaft 71. A ball 74 having a spherical protrusion at the top is formed integrally to the nut 73. The outer circumferential surface of the ball 74 is slidably fit in the inner circumferential surface 75A of the sleeve 75 so that a spherical joint is constituted.

Between the rear journal 44B and the right end 734 of the nut 73, a buffer 82 is fit on the outer circumferential surface of the feeding screw shaft 71. Between the worm wheel 72 and the left end 733 of the nut 73, another buffer 81 is fit on the outer circumferential surface of the feeding screw shaft 71.

As in the first embodiment, the buffer 81, 82 has the same shape. When necessity of adjusting the telescopic position of the steering wheel 3 occurs, operating the switch not shown, the electric motor 61 is rotationally driven. Then, the reduced rotation of the electric motor 61 is transmitted from the worm gear 62 to the worm wheel 72. Since the feeding screw shaft 71 integrated to the worm wheel 72 rotates, the nut 73 moves rightward (backward of the vehicle body) along the screw segment of the feeding screw shaft 71.

Then, the ball 74 integrated to the nut 73 also moves rightward (backward of the vehicle body). In this case, because the ball 74 is fit in the sleeve 75, the inner column 43 telescopically moves rightward. When the inner column 43 reaches a telescopic retracted end, the right end 734 of the nut 73 abuts on the buffering segment 83 side of the buffer 82. Thus, while the buffering segment 83 of the buffer 82 is elastically deformed, the nut 73 stops with no impact.

Accordingly, the inertia occurred when the nut 73 stops is restrained and the tightening torque of the nut 73 when the nut 73 stops is also restrained. For this reason, when the electric motor 61 is rotationally driven in a reverse direction, the feeding screw shaft 71 rotates in the reverse direction with the normal rotation torque of the electric motor 61. Thus, the nut 73 is moved leftward (forward of the vehicle body) along the screw segment of the feeding screw shaft 71 so that the inner column 43 can be telescopically moved leftward.

As seen from FIG. 6, also when the inner column 43 reaches a telescopic advanced end, the left end 733 of the nut 73 abuts on the buffering segment 83 side of the buffer 81. Thus, while the buffering segment 83 of the buffer 81 is elastically deformed, the nut 73 stops with no impact. Accordingly, the inertia when the nut 73 stops is restrained and the tightening torque of the nut 73 when the nut 73 stops is also restrained.

Embodiment 3

Figure 7:
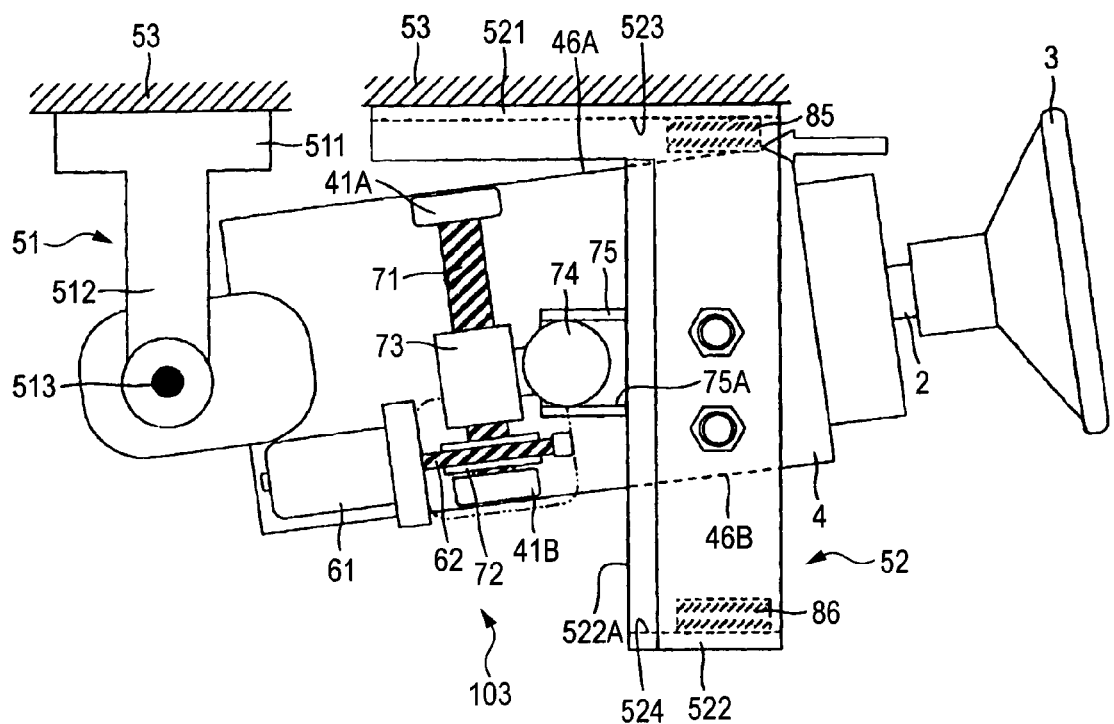
FIG. 7 is a schematic view of the main part including a partial section of an electric tilting steering device according to the third embodiment of the present invention, which illustrates the state stopped at a tilting ascent end.
Figure 8:
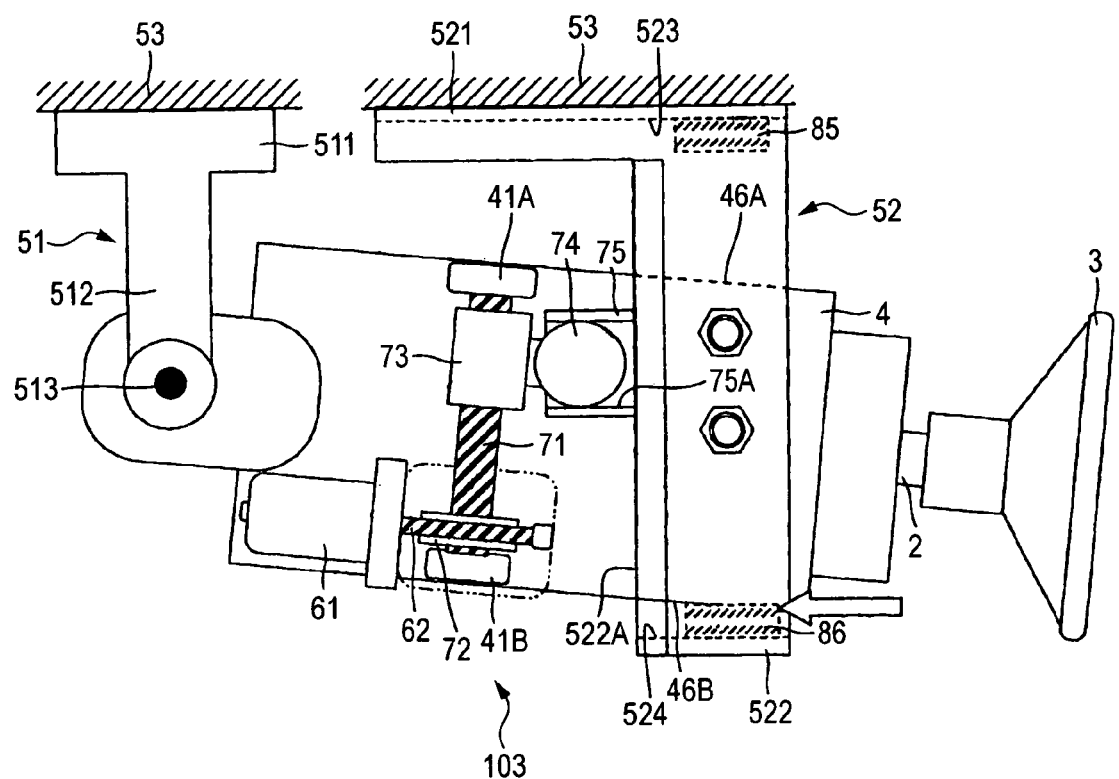
FIG. 8 is a schematic view of the main part including a partial section of the electric tilting steering device shown in FIG. 7, which shows the state stopped at a tilting descent end.

Next, an explanation will be given of the third embodiment of the present invention. FIG. 7 is a schematic view of the main part including a partial section of an electric tilting steering device 103 according to the third embodiment of the present invention, which illustrates the state stopped at a tilting ascent end. FIG. 8 is a schematic view of the main part including a partial section of the electric tilting steering device 103 shown in FIG. 7, which shows the state stopped at a tilting descent end. In the following explanation, only the structural portion different from the above embodiments will be explained and overlap of the explanation will be avoided. Further, in this embodiment, like reference numerals refer to like elements in the above embodiments.

In the first embodiment, the buffer is mounted on the outer circumferential surface of the feeding screw shaft 71. On the other hand, in the third embodiment, the buffer is mounted between the column 4 and an upper vehicle-body attaching bracket 52. Specifically, a buffer 85 is secured to the upper surface 523 of the upper vehicle-body attaching bracket 52. Another buffer 86 is secured to the lower surface 524 of the upper vehicle-body attaching bracket 52.

The buffer 85, 86 is made of an elastic material such as rubber, urethane and synthetic resin. As in the first embodiment, the buffer 85, 86 may have the structure with endurance improved by integrally joining a buffering segment made of the elastic material and a reinforcing segment made of metal.

When necessity of adjusting the tilting position of the steering wheel 3 occurs, operating the switch not shown, the electric motor 61 is rotationally driven. Then, the reduced rotation of the electric motor 61 is transmitted from the worm gear 62 to the worm wheel 72. Since the feeding screw shaft 71 integrated to the worm wheel 72 rotates, the nut 73 descends in an axial direction along the screw segment of the feeding screw shaft 71.

Then, as seen from FIG. 7, the column 4 tiltingly moves upward because the ball 74 integrated to the nut 73 also descends with respect to the column 4 while the ball 74 is fitted to the sleeve 75. When the column 4 reaches a tilting ascent end, the upper face 46A of the outer circumferential surface of the column 4 abuts on the buffer 85. Thus, while the buffer 85 is elastically deformed, the column 4 stops with no impact. When the upper face 46A of the outer circumferential surface of the column 4 abuts on the buffer 85 and so the column 4 stops, a gap may be given between the lower end of the nut 73 and the worm wheel 72.

Accordingly, the inertia occurred when the nut 73 stops is restrained and the tightening torque of the nut 73 when the nut 73 stops is also restrained. For this reason, when the electric motor 61 is rotationally driven in a reverse direction, the feeding screw shaft 71 rotates in the reverse direction with the normal rotation torque of the electric motor 61. Thus, the nut 73 is caused to ascend in the axial direction along the screw segment of the feeding screw shaft 71 so that the column 4 can be tiltingly moved downward.

As seen from FIG. 8, also when the column 4 reaches a tilting descent end, the lower face 46B of the outer circumferential surface of the column 4 abuts on the buffer 86. Thus, while the buffer 86 is elastically deformed, the column 4 stops with no impact. Accordingly, the inertia when the nut 73 stops is restrained and the tightening torque of the nut 73 when the nut 73 stops is also restrained. When the lower face 46B of the outer circumferential surface of the column 4 abuts on the buffer 86 and so the column 4 stops, a gap may be given between the upper end of the nut 73 and the upper journal 41A.

Embodiment 4

Figure 9:
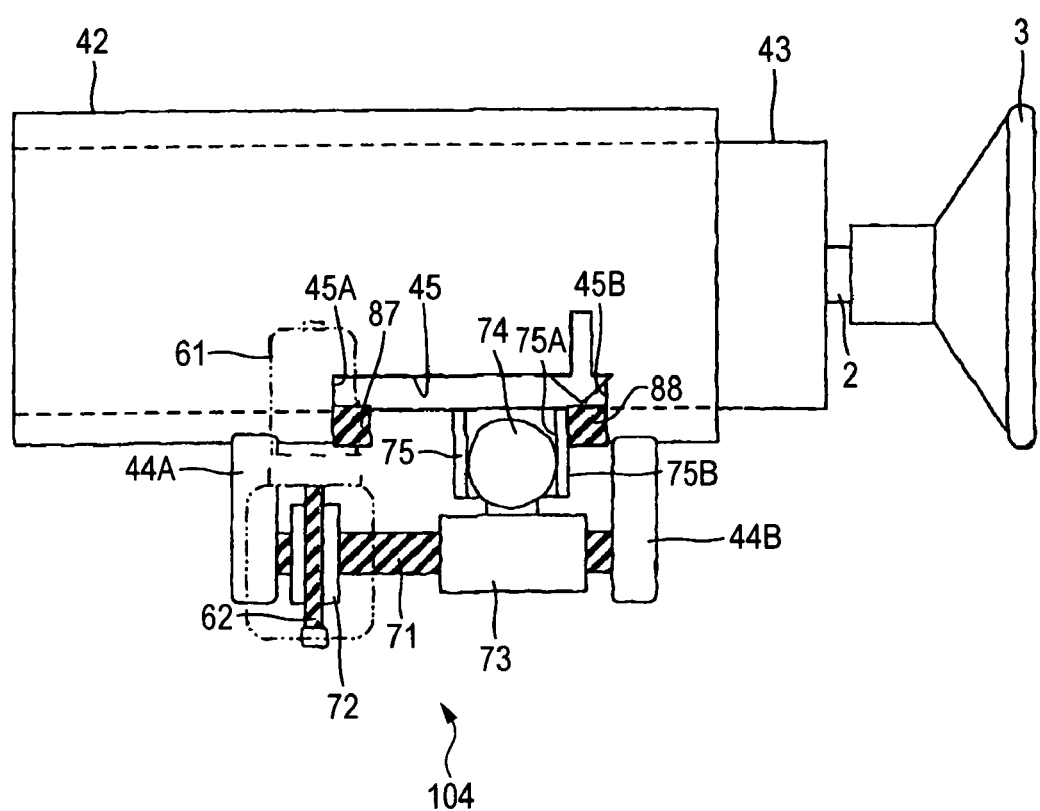
FIG. 9 is a schematic view of the main part including a partial section of an electric telescopic steering device 104 according to the fourth embodiment of the present invention, which illustrates the state stopped at a telescopic retracted end.
Figure 10:
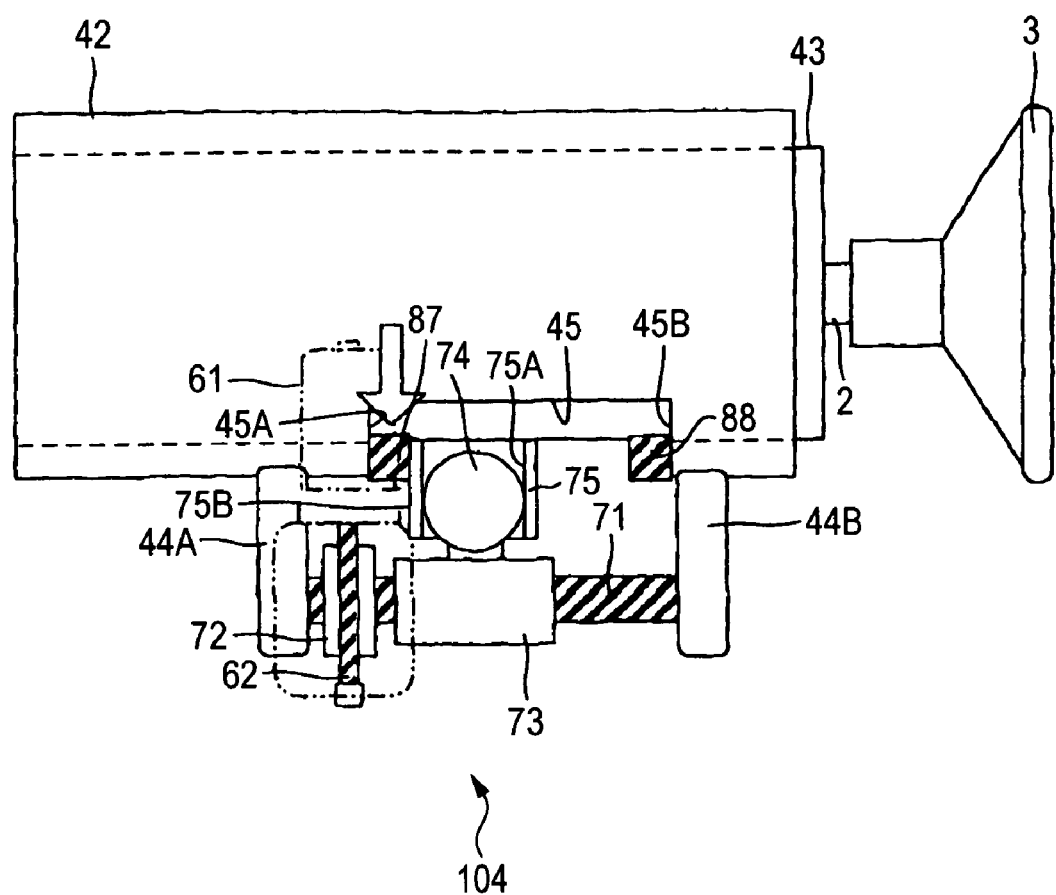
FIG. 10 is a schematic view of the main part including a partial section of the electric telescopic steering device shown in FIG. 9, which shows the state stopped at a telescopic advanced end.

Next, an explanation will be given of the fourth embodiment of the present invention. FIG. 9 is a schematic view of the main part including a partial section of an electric telescopic steering device 104 according to the fourth embodiment of the present invention, which illustrates the state stopped at a telescopic retracted end. FIG. 10 is a schematic view of the main part including a partial section of the electric telescopic steering device 104 shown in FIG. 9, which shows the state stopped at a telescopic advanced end. In the following explanation, only the structural portion different from the above embodiments will be explained and overlap of the explanation will be avoided. Further, in this embodiment, like reference numerals refer to like elements in the above embodiments.

In the second embodiment, the buffer is mounted on the outer circumferential surface of the feeding screw shaft 71. On the other hand, in the fourth embodiment, the buffer is mounted between the opening 45 of the outer column 42 and the sleeve 75. Specifically, a buffer 87 is secured to the front end 45A of the opening 45 and another buffer 88 is secured to the rear end 45B of the opening 45.

The buffers 87 and 88 have the same shape and are made of the elastic material such as rubber, urethane and synthetic resin. As in the first embodiment, the buffer 87, 88 may have the structure with endurance improved by integrally joining a buffering segment made of the elastic material and a reinforcing segment made of metal.

When necessity of adjusting the telescopic position of the steering wheel 3 occurs, if the switch not shown is operated, the electric motor 61 is rotationally driven. Then, the reduced rotation of the electric motor 61 is transmitted from the worm gear 62 to the worm wheel 72. Since the feeding screw shaft 71 integrated to the worm wheel 72 rotates, the nut 73 moves rightward (backward of the vehicle body) along the screw segment of the feeding screw shaft 71.

Then, the ball 74 integrated to the nut 73 also moves rightward (backward of the vehicle body). In this case, because the ball 74 is fit in the sleeve 75, the inner column 43 telescopically moves rightward. When the inner column 43 reaches a telescopic retracted end, the outer circumferential surface 75B of the sleeve 75 abuts on the buffer 88. Thus, while the buffer 88 is elastically deformed, the sleeve 75 stops with no impact. When the outer circumferential surface 75B of the sleeve 75 abuts on the buffer 88 and so the sleeve 75 stops, a gap may be given between the right end of the nut 73 and the rear journal 44B.

Accordingly, the inertia when the nut 73 stops is restrained and the tightening torque of the nut 73 when the nut 73 stops is also restrained. For this reason, when the electric motor 61 is rotationally driven in a reverse direction, the feeding screw shaft 71 rotates in the reverse direction with the normal rotation torque of the electric motor 61. Thus, the nut 73 is moved leftward (forward of the vehicle body) along the screw segment of the feeding screw shaft 71 so that the inner column 43 can be telescopically moved leftward.

As seen from FIG. 10, also when the inner column 43 reaches a telescopic advanced end, the outer circumferential surface 75B of the sleeve 75 abuts on the buffer 87. Thus, while the buffer 87 is elastically deformed, the sleeve 75 stops with no impact. Accordingly, the inertia when the nut 73 stops is restrained and the tightening torque of the nut 73 when the nut 73 stops is also restrained. When the outer circumferential surface 75B of the sleeve 75 abuts on the buffer 87 and so the sleeve 75 stops, a gap may be given between the left end of the nut 73 and the worm wheel 72.

Further, in the electric steering device according to the present invention, because of the presence of the buffer, a long permissible time can be taken until the nut or the column stops at the moving end. Therefore, also in the fail-safe function such as protective control of an excessive current, control is made so that the electric actuator stops within an elastic limit of the buffer. Thus, the impact at the time of stop can be alleviated. In addition, as regards the inconvenience of position control due to voltage shortage or pulse drift of a control signal, the operation of the electric actuator can be stopped while the impact is alleviated.

Figure 11A:
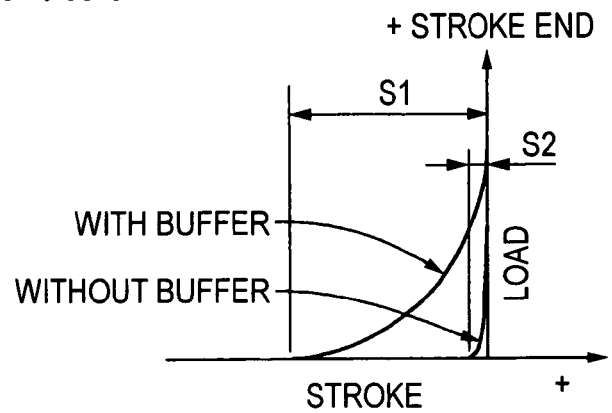
FIG. 11A is a graph showing a load curve at the time of stop at a + stroke end in both cases of the presence and absence of the buffer.
Figure 11B:
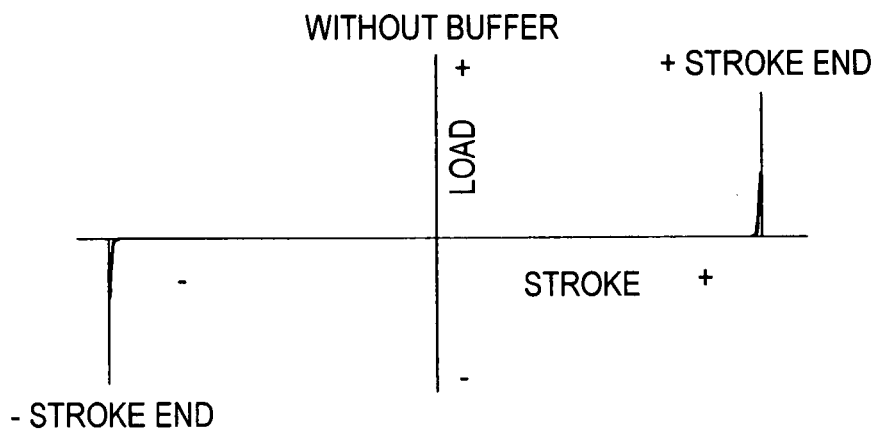
FIG. 11B is a graph showing a load curve over the entire stroke in the case of the absence of the buffer.
Figure 11C:
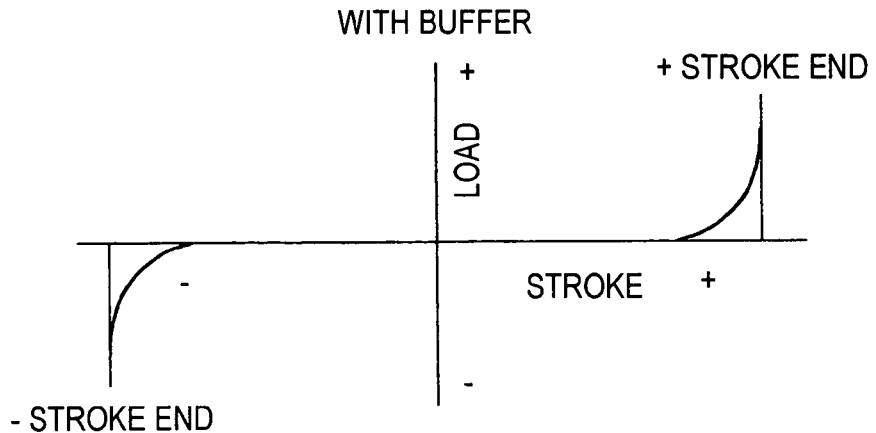
FIG. 11C is a graph showing a load curve over the entire stroke in the case of the presence of the buffer.

FIG. 11A is a graph showing a load curve at the time of stop at a + stroke end in both cases of the presence and absence of the buffer. FIG. 11B is a graph showing a load curve over the entire stroke in the case of the absence of the buffer. FIG. 11C is a graph showing a load curve over the entire stroke in the case of the presence of the buffer.

As seen from the load curve in the absence of the buffer in FIG. 11A and the load curve over the entire stroke in the case of the absence of the buffer in FIG. 11B, the nut or the column strikes with the securing portion of the moving end with a short stroke S2. Therefore, conventionally, since a permissible time until the electric actuator stops is short, even if control of stopping the operation is made, there was a fear that the nut or the column strikes with the securing portion. Further, the protective control of an excessive current adopts a technique of stopping the operation if an abnormal value of the current generated when the nut or the column abuts on the securing portion is detected. However, since the permissible time until the electric actuator stops is short, there was fear beyond supposition that the nut or the column strikes with the securing portion. Further, as regards such inconvenience against which the protective control of the excessive current functions, for example, the inconvenience of position control due to voltage shortage or pulse drift of a control signal, there was fear of generating same problem.

On the other hand, in accordance with the present invention, as seen from the load curve in the case of the presence of the buffer in the present invention in FIG. 11A and the load curve over the entire stroke in the case of the presence of the buffer in the present invention in FIG. 11C, the nut or the column stops with no impact at the securing portion of the moving end while the buffer is elastically deformed with a longer stroke S1 than before.

Thus, the permissible time until the electric actuator stops is lengthened. For this reason, control can be made so that the electric actuator stops before the nut or the column abuts on the securing portion and stops. Therefore, also in the fail-safe function such as protective control of an excessive current, the control can be made so that the electric actuator stops within an elastic limit of the buffer. Thus, the impact at the time of stop can be alleviated. In addition, as regards the inconvenience of position control due to voltage shortage or pulse drift of a control signal, the operation of the electric actuator can be stopped while the impact is alleviated.

In the embodiments described above, the adjustment of only either one of the telescopic position and tilting position has been explained. However, the present invention may be applied to the steering device capable of adjusting both the telescopic position and the tilting position.

What is claimed is:

1. An electric steering device comprising:
   a steering shaft of which a vehicular-rear side is capable of mounting a steering wheel;
   a column that pivotably supports the steering shaft, the column allowing adjustment of a tilting position on a fulcrum of a tilting center axis or of a telescopic position along a center axial line of the steering shaft;
   an electric actuator attached to the column;
   a feeding screw shaft that is pivotably supported on the column so as to be rotated by the electric actuator and has a screw segment on an outer circumferential surface thereof;
   a nut that is screwed on the screw segment of the feeding screw shaft, and converts a rotation of the feeding screw shaft into a linear motion to transmit the linear motion as a tilting motion or telescopic motion of the column; and
   buffers each of which abuts on the nut at moving ends of the linear motion of the nut to buffer an impact force when the nut stops at the moving end,
   wherein the buffer is formed in a hollow disk shape,
   wherein an inner hole of the buffer is fit on the outer circumferential surface of the feeding screw shaft;
   wherein the feeding screw shaft includes a small-diameter shaft segment formed at an end of the feeding screw shaft, that is smaller in diameter than the screw segment of the feeding screw shaft and wherein the inner hole of the buffer is an inclined hole, and an edge of the inclined hole contacts the outer circumferential surface of the small-diameter shaft segment.

2. The electric steering device according to claim 1, wherein the buffers abut on the column at a tilting ascent end or a tilting descent end of the column to buffer an impact force when the column stops at the moving end of the column.

3. The electric steering device according to claim 2, wherein the buffer comprises:

a buffering segment made of an elastic material; and a reinforcing segment made of a metallic material, wherein the buffering segment and the reinforcing segment are joined to each other.

4. The electric steering device according to claim 2, wherein the electric actuator is controlled to stop within an elastic limit of the buffer.

5. The electric steering device according to claim 1, wherein the buffers abuts on the column at a telescopic advanced end and a telescopic retracted end of the column to buffer an impact force when the column stops at the moving end of the column.

6. The electric steering device according to claim 5, wherein the buffer comprises:

a buffering segment made of an elastic material; and a reinforcing segment made of a metallic material, wherein the buffering segment and the reinforcing segment are joined to each other.

7. The electric steering device according to claim 5, wherein the electric actuator is controlled to be stop within an elastic limit of the buffer.

8. The electric steering device according to claim 1, wherein the column comprises:

an outer column; and an inner column supported on the outer column so as to allow adjustment of a telescopic position;

wherein the electric steering device further comprises:

a spherical protrusion on the nut;

an opening on the outer column; and a cylindrical sleeve that is projecting from the inner column toward the outer column through the opening, and fits on the spherical protrusion thereby to transmit the linear motion of the nut to the inner column, wherein the buffers are formed at each of a front end and a rear end of the opening, each of the buffers abuts on the sleeve at each of a telescopic advanced end or a telescopic retracted end of the inner column to buffer an impact force when the sleeve stops at a moving end of the inner column.

9. The electric steering device according to claim 8, wherein the buffer comprises:

a buffering segment made of an elastic material; and a reinforcing segment made of a metallic material, wherein the buffering segment and the reinforcing segment are joined to each other.

10. The electric steering device according to claim 8, wherein the electric actuator is controlled to be stop within an elastic limit of the buffer.

11. The electric steering device according to claim 1, wherein the buffer comprises:

a buffering segment made of an elastic material; and a reinforcing segment made of a metallic material, wherein the buffering segment and the reinforcing segment are joined to each other.

12. The electric steering device according to claim 1, wherein the electric actuator is controlled to stop within an elastic limit of the buffer.

* * * * *